Feb. 20, 1968 H. J. STRAUBE 3,370,187
ELECTROMECHANICAL APPARATUS
Filed April 30, 1965

INVENTOR.
HELMUT J. STRAUBE
BY Samuel R. Genca
ATTORNEY

United States Patent Office 3,370,187
Patented Feb. 20, 1968

3,370,187
ELECTROMECHANICAL APPARATUS
Helmut J. Straube, Webster, N.Y., assignor to General Dynamics Corporation, a corporation of Delaware
Filed Apr. 30, 1965, Ser. No. 452,052
The portion of the term of the patent subsequent to December 26, 1984, has been disclaimed
10 Claims. (Cl. 310—9.1)

ABSTRACT OF THE DISCLOSURE

An electromechanical transducer is described including a flexural vibratile member comprising a driven radiating portion having a channel for receiving an electrically responsive device, a stationary rim portion and a hinge portion connected to said stationary portion and about which flexure takes place.

The present invention relates to electromechanical transducer apparatus, and more particularly to an improved coupling means for an electromechanical transducer.

Although the present invention is suited for more general applications, it is particularly adapted for use in transducers of the bender type as in hydrophone applications.

A typical transducer of the bender type may include a pair of bonded active components in the form of juxtaposed piezoelectric ceramic disks or plates mounted so as to undergo flexure when subjected to acoustic energy. The surfaces of the disks which are bonded together define the bond plane of the transducer and a line across the bond plane is called a bond line. This flexure gives rise to an electrical voltage between electrodes on opposite faces of each disk, which voltage is representative of the acoustic energy impinging upon the disks. The transducer may also be used as a sound projector for converting alternating electrical energy into compressional wave energy or acoustic energy. The ceramic disks generate acoustic energy by bending in response to an applied electrical signal voltage.

Criteria for a good electromechanical transducer are high efficiency and bandwidth. The bandwidth of a transducer is dependent on several characteristics and an important one is the coupling coefficient; that is, the ratio of electrical energy converted into mechanical energy by the transducer or the ratio of the mechanical energy which is converted into electrical energy by the transducer. The coupling co-efficient of an electromechanical transducer can be determined from a measurement of its resonance and anti-resonance frequencies by the equation:

$$K=\sqrt{\frac{f_a^2-f_r^2}{f_a^2}} \qquad (1)$$

where $f_a$ is the antiresonant frequency or the frequency where maximum impedance occurs and $f_r$ is the resonant frequency.

A problem of long standing in transducers of the bender type is the inherent poor coupling coefficient which restricts their use where relatively large bandwidths are required. The problem may be observed from the relative movement of the juxtaposed piezoelectric ceramic disks in response to an electrical input signal applied across each of the piezoelectric ceramic disks. One disk contracts radially, while the other expands radially alternately at a signal frequency. The coaction of the two piezoelectric disks is along the bond plane between the adjacent faces of the piezoelectric disks. Since one of the piezoelectric disks contracts radially and the other piezoelectric disk expands radially, the juxtaposed piezoelectric disks bend or flex in a dish-like manner in response to the electrical input signal to generate mechanical energy. It should be noted that only that radial movement of the juxtaposed piezoelectric disks along the bond surface gives rise to the flexure of the juxtaposed piezoelectric disks, while radial expansion and contraction of the periphery and the unbonded faces of the piezoelectric disks do not substantially contribute to the flexure and therefore to the conversion of the electrical energy to mechanical energy. Thus, a relatively poor coupling coefficient results.

Accordingly, it is an object of the present invention to provide an improved electromechanical transducer.

It is another object of the present invention to provide an electromechanical transducer having an improved coupling coefficient.

It is still another object of the present invention to provide an improved transducer for converting mechanical forces into an electrical output and conversely for converting an electrical input into a mechanical output.

It is a further object of the present invention to provide an improved transducer which is inexpensive and simple to construct.

Briefly described, the present invention accomplishes the above objects and other objects by an improved electromechanical transducer. In accordance with one embodiment thereof, the transducer includes a frame, a flexural vibratile member of elastic material such as steel, or aluminum, and at least one piezoelectric disk of a given thickness and diameter. The flexural vibration member includes a stationary rim portion fixed to the frame and a driven radiating portion interconnected to the rim portion by a hinge portion disposed along a neutral plane or zero stress plane through the driven radiating portion. The driven radiating portion includes a cylindrical cavity on one side of the neutral plane adapted to receive the piezoelectric disk in a radial constraining manner so that any radial expansion of the piezoelectric disk will be transmitted to the side wall of the cavity in a direction parallel to the neutral plane. The piezoelectric disk may be cemented within the cavity by a relatively hard cement such as one of the epoxy cements. The piezoelectric disk may be polarized in a direction normal to the opposite principal faces thereof and includes electrodes on the principal faces so that the piezoelectric disk will expand radially in response to an electrical input signal applied to the electrodes.

The side wall of the cavity in the driven radiating portion defines a monolithic rim supported at the hinge portion so that the monolithic rim may pivot about the hinge portion when a force such as produced by radial expansion of the piezoelectric disk is effective on the side wall of the cavity above the neutral plane. The driven radiating portion includes a thin center disk portion which is at the bottom of the cavity and which extends to the other side of the neutral plane. The center disk portion is integral with the monolithic rim so that any pivoting and rotating movement of the monolithic rim will be amplified at the center of the thin center disk portion. Thus, when the piezoelectric disk is excited into vibration by an electrical signal it expands and contracts radially to apply a force parallel to the neutral plane not only on the thin center portion along the bond line, but also on the monolithic rim. The force on the rim results in additional flexure of the driven radiating portion and the piezoelectric disk and effectively amplifies the flexure. It has been found that the difference between the resonant and antiresonant frequency of the transducer has been increased over known transducers of the bender type. Accordingly, the transducer provided by the invention has a larger bandwidth. The coupling coefficient of the transducer is thus improved over the prior art since radial expansion along the bond lines and radial expansion along the periphery of the piezoelectric disk are utilized in accordance with the invention.

Other objects and features of this invention will become more apparent to those skilled in the art by reference to the specific embodiments described in the following specification and shown in the accompanying drawings in which.

Figure 1:
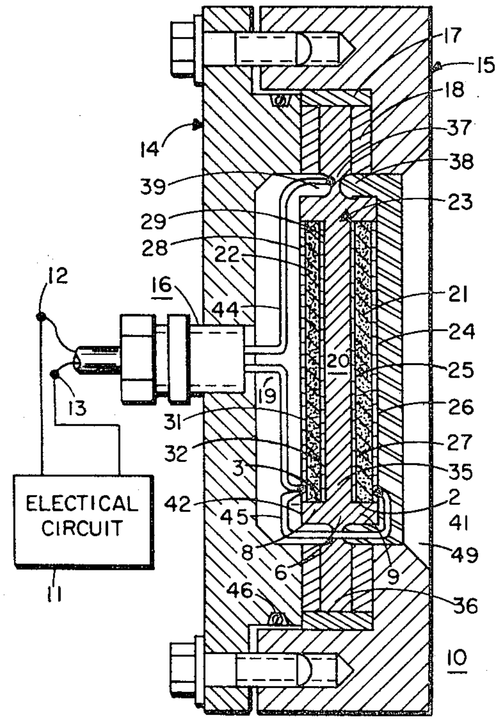
FIG. 1 is a central cross-sectional view of a transducer in accordance with the invention.
Figure 2:
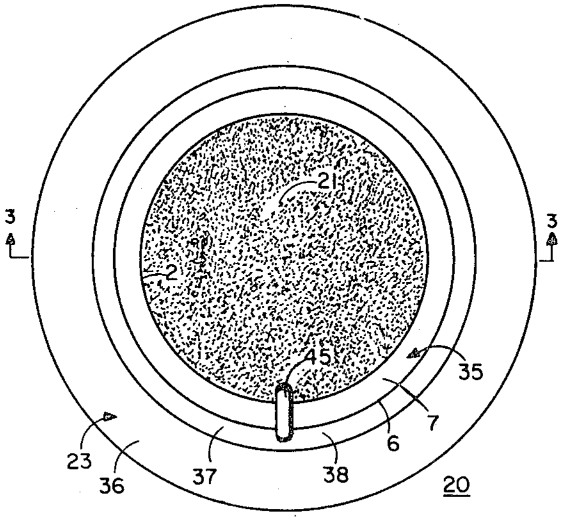
FIG. 2 is a front view of a laminar transducer unit included in the transducer of FIG. 1.
Figures 3, 4, 5:
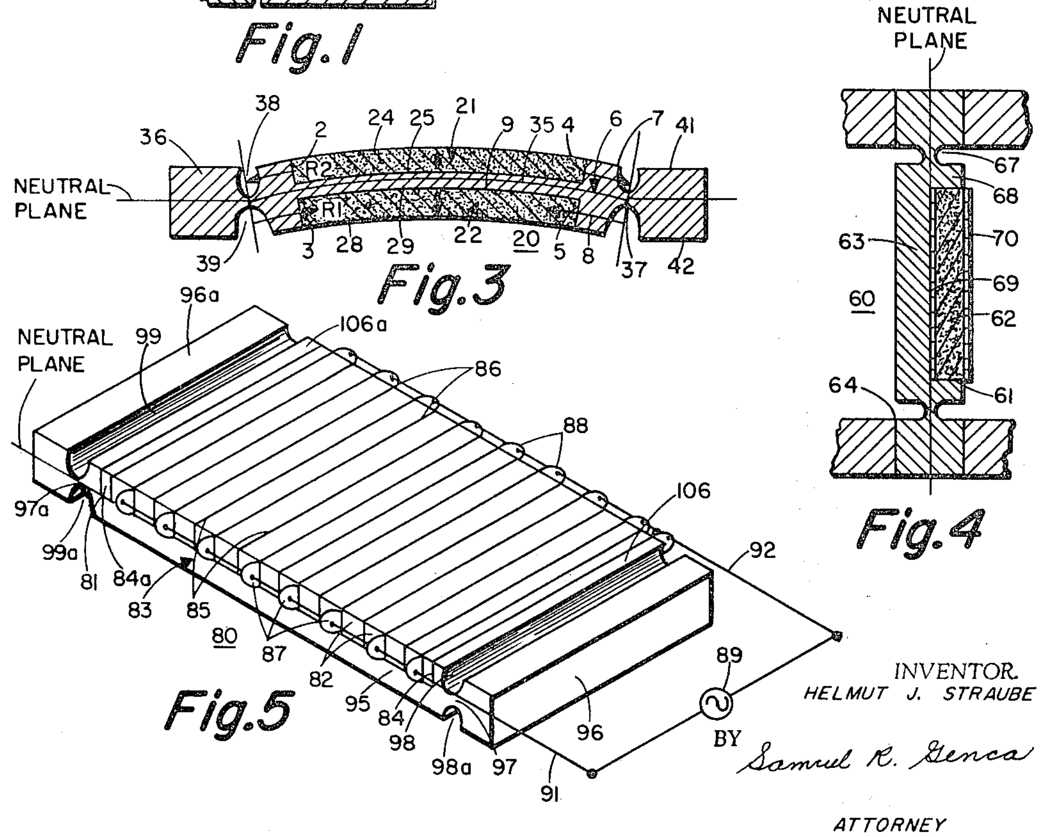
FIG. 3 is a central cross-sectional view of the laminar transducing unit of FIG. 2, illustrating the laminar transducing unit of FIG. 2, illustrating the laminar transducing unit in an exaggerated flexural mode.
FIG. 4 is a central cross-sectional view of another laminar transducing unit in accordance with the invention employing a single piezoelectric disk.
FIG. 5 is a perspective view of another embodiment of the invention in a rectangular laminar transducing unit including a plurality of piezoelectric elements disposed in a side-by-side relationship.

Referring first to FIGS. 1–3 and more particularly to FIG. 1, an electromechanical transducer 10 is shown coupled to an electrical circuit 11 at terminals 12 and 13. The transducer 10 comprises a laminar transducing unit 20, a watertight casing or housing 14 and a ring member 15 for securing the laminar transducing unit 20 within the housing 14.

The laminar transducing unit 20 includes active elements such as first and second piezoelectric ceramic disks 21 and 22 respectively and a flexural vibrating element 23 coupled to the piezoelectric disks 21 and 22 in accordance with the invention. The flexural vibrating element 23 is shown more in detail in FIGS. 2 and 3. The active elements may be magneto-strictive or electro-strictive elements without departing from the invention. The active elements for illustrative purposes are first and second piezoelectric ceramic disks 21 and 22 of a polarizable ferro-electric ceramic material, which may be for example, barium titanate, and solid solutions of lead zirconate and lead titanate. When polarized by the application of a strong electrostatic field, these ceramic disks 21 and 22 have properties corresponding to the piezoelectric effect of crystalline material such as quartz and Rochelle salt.

The first piezoelectric ceramic disk 21 includes first and second opposite principal surfaces 24 and 25 respectively and a first circular periphery 2 having a given diameter. The first and second principal surfaces 24 and 25 are coated with an electrical conducting material to form an outer first electrode 26 and an inner first electrode 27. The second piezoelectric ceramic disk 22 includes third and fourth outside principal surfaces 28 and 29 respectively, and a second outer periphery 3 having a second diameter which is substantially equal to the diameter of the first ceramic disk 21. The third and fourth principal surfaces 28 and 29 are also coated with an electrically conducted material to form an outer second electrode 31 and an inner second electrode 32. Although coated electrodes of an electrical conducting material are shown, other types of flexible electrodes such as copper foil or mesh, may be used for applying an electrical field across the first and second piezoelectric ceramic disks 21 and 22 in a manner well known to those skilled in the art. In some cases the inner electrode may be omitted since the flexural vibrating element 23 may serve as an inner electrode for both ceramic disks 21 and 22 when it is made of an electrically conducting material such as steel or Phosphor bronze. The first and second piezoelectric ceramic disks 21 and 22 are polarized normal to the principal surfaces 24, 25, 28 and 29 respectively, as shown by arrows in FIG. 3, so that a voltage or potential or electrical signal applied to the electrodes

26 and 27 changes the radial dimension of the piezoelectric ceramic disk 21, that is, it contracts or expands radially. In a like manner a voltage applied to the electrodes 31 and 32 and the second piezoelectric disk 22 changes the radial dimensions to the piezoelectric ceramic disk 22 in an amount proportional to the electrical input signal. The first and second piezoelectric ceramic disks 21 and 22 may be also made to contract or expand selectively when not polarized by applying a biasing voltage across electrodes 26, 27 and 31 and 32 respectively and applying an electrical signal voltage which varies about the biasing voltage.

The flexural vibrating element 23 includes a driven radiating portion 35, a stationary peripheral or rim portion 36 and a hinge portion 37 defined by two similar coaxial grooves 38 and 39 disposed in a back-to-back relationship on major faces 41 and 42 respectively of the flexural radiating element 23. The coaxial grooves 38 and 39 are of equal depth and encircle the discoid driven radiating portion 35 as illustrated in FIGS. 2 and 3. The flexural vibrating element 23 may be made of an elastic resilient material such as steel, Phosphor bronze, or the like.

The hinge portion 37 is decoupled from the major faces 41 and 42 of the flexural vibrating element 23, and lies on both sides of a zero stress plane or neutral plane extending through the flexural vibrating element 23. The neutral plane or zero stress plane of the flexural vibrating element 23 is that plane which does not substantially change its radial dimensions during flexure of the driven radiating portion 35. The neutral plane contains a neutral axis and is perpendicular to the direction of flexure of the driven radiating portion 35. Stated in another way, the intersection of the cross-section of the flexural radiating element 23 and the neutral plane of the flexural radiating element 23 defines a neutral axis. The grooves 38 and 39 are symmetrical with respect to the location of the neutral plane or zero stress plane.

The hinge portion 37 is relatively compliant to lateral movement of the major faces 41 and 42 or to flexure of the driven radiating portion 35. The hinge portion 37 however is substantially rigid for end thrust or piston-like movement of the radiating portion 35. The hinge portion 37 provides an edge support for the radiating portion 35. The flexural vibrating element 23 is fixed at the rim portion 36 and the driven radiating portion 35 of the flexural vibrating element 23 can be excited into flexural vibrations about the hinge portion 37. More complete details of the hinge portion 37 may be found in my copending U.S. patent application Ser. No. 407,685 for Electromechanical Apparatus.

In accordance with the invention the driven radiating portion 35 includes two cavities, a first cylindrical cavity 4 coaxially disposed within the major surface 41 on one side of the neutral plane and a second cylindrical cavity 5 disposed within the major surface 42 on the other side of the neutral plane. The first and second cavities 4, 5 are adapted to receive the first and second piezoelectric ceramic disks 21 and 22 respectively in a contiguous constraining relationship about the peripheries 2, 3 of the first and second piezoelectric disks 21 and 22. The depth of the first and second cavities is substantially equal to the thickness of the first and second piezoelectric disks 21 and 22, and the diameters of the first and second cylindrical cavities 4, 5 are substantially equal to the diameters of the first and second piezoelectrical disks 21 and 22 respectively. This relationship has a secondary advantage in that the first and second piezoelectric ceramic disks 21 and 22 may be easily coaxially positioned within the first and second cylindrical cavities 4 and 5. One of the chief advantages of the invention will be discussed hereinafter.

The first and second cylindrical cavities each have a diameter which is less than the diameter of the discoid driven radiating portion 35 so that the driven radiating portion 35 includes a monolithic rim 6 having first and second collars or ring portions 7, 8 which encompass and constrain the first and second piezoelectric disks 21 and 22 respectively and a thin center disk portion 9 disposed between the first and second piezoelectric disks 21 and 22. The first and second collars or ring portions 7, 8 may radialy prestress the first and second disks 21 and 22 to vary the operating characteristics for the transducer 10. A cross section of the monolithic rim 6 may be considered as a beam which is pivoted at a mid point which lies within the neutral plane at the hinge portion 37. The cross sectional view of the monolithic rim 6 may also be likened to a double cantilever which is fixed at a midpoint at the hinge portion 37. The first and second piezoelectric ceramic disks 21 and 22 are cemented to the thin center disk portion 9 and to the monolithic rim 6 at the periphery thereof. The first and second piezoelectric disks may, when excited by an electrical input signal, uniformly load the first and second ring portions 7, 8 and the monolithic rim radially so that a resultant force couple $R_1$ and $R_2$ respectively act on the monolithic rim 6 above the hinge portion 37, a distance $Y_1$ and $Y_2$ above the neutral plane. In consequence to the pivoting of the monolithic beam 6 about the hinge portion 37, the thin center disk portion 9 flexes or bends in a flexural mode. A small pivotal motion of the monolithic beam 6 is amplified at the center of the driven radiating portion and the thin center disk portion 9.

In accordance with the invention, the cylindrical cavities eliminate one of the problems of the prior art which require that the adhesive be thin enough so as to have negligible coupling loss between the first and second piezoelectric ceramic disks 21, 22 and the radiating portion 35. In the present invention, radial expansion of the first and second piezoelectric disks 21 and 22 is utilized so that better mechanical coupling may be had than the mechanical coupling which was provided by the adhesive or cement between the driven radiating portion 35 and the piezoelectric ceramic disks 21 and 22. This of course results in an improved coupling coefficient for the transducer 10. This may be seen by considering the flexural mode of vibration of the driven radiating portion 35. The flexural mode vibration of the driven radiating portion 35 is characterized by the axial displacement of the driven radiating portion 35 which starts at the hinge portion 37 which may be considered a nodal circle and reaches a maximum or anti-node of the center of the driven radiating portion 35 and the thin center disk portion 9. The manner in which the driven portion 35 and the thin center disk portion 9 bends or flexes is shown in exaggerated view in FIG. 3 and will be described in the operation of the transducer 10.

The laminar transducing unit 20 is clamped within the housing 14 in an annular groove 17 formed by a space between the housing 14 and the retaining ring member 15. The rim portion 36 is fixed within the groove 17. Also disposed in the annular groove 17 and around portion 36 is a hard electrical insulating split ring member 18 which electrically insulates the laminar transducing unit 20 from the housing 14 and the retaining ring member 15.

The split ring member 18 is made of a hard electrical insulating material which is relatively non-compliant to axial and radial movement of the rim portion 36. The housing 14 is made of a hard rigid material such as steel, fiber glass, plastic, or the like, and includes a cavity 19. The cavity 19 may be filled with a pressure release material such as air or gas and may also contain an electrical amplifier or preamplifier not shown therein. The housing 14 includes a water-tight joint at 16. The water-tight joint 16 forms no part of this invention and may be of any one of the well-known water-tight joints for sub-aqua hydrophones and transducers. An O ring 46 provides a water-tight seal between the housing 14 and the ring member 15.

A flexible diaphragm 48, such as rubber, covers the laminar transducing unit 20 and provides a fluid seal for the housing 14 at the groove 17. The ring member 15 includes an opening 49 which is slightly greater than the diameter of the radiating portion 35 of the flexural vibrating element 23 to form an acoustic window with the flexible diaphragm 48. A series of bolts 51 threaded in holes 52 of the housing 14 draw the ring member 15 towards the housing 14 and clamp the laminar transducing unit 20, the split ring member 22 and diaphragm 48 within the groove 17.

The electrical circuit 11 is connected to the first and second outer electrodes 26 and 31 of the first and second piezoelectric disks 21 and 22 respectively by a lead wire 44. A lead wire 45 connects the first and second inner electrodes 27 and 32 of the first and second piezoelectric disks 21 and 22 to the electrical circuit 11. The piezoelectric disks 21 and 22 are connected in parallel such that they both flex in the same direction in response to a given electrical input signal.

In the operation of the transducer 10, acoustic energy or acoustic pressures within the surrounding area are transmitted through the diaphragm 48 to the laminar transducing unit 20. The acoustic pressure exerts a mechanical force on the driven radiating portion 35 of the laminal transducing unit 20. The force is predominantly axial on the laminar transducing unit 20 and is substantially uniformly distributed so that the driven radiating portion 35 flexes or dishes as a diaphragm. This diaphragm action is characterized by a flexural mode or concave-convex flexure, wherein there is relatively no displacement at a nodal circle which occurs at the hinge portion 37 and a maximum displacement at the anti-node which occurs at the center of the driven radiating portion 35 as indicated in FIG. 3. Each of the first and second piezoelectric disks 21 and 22 and the thin center disk portion 9 of the driven radiating portion 35 manifest a dish-like distortion in response to the acoustic pressure and may be vibrated in a flexural mode of vibration in response to acoustic energy.

The first and second piezoelectric disks 21 and 22, in consequence to the distortion, each produce a voltage across the first and second inner electrodes 26, 27 and the first and second outer electrodes 31, 32 respectively, which voltages are additive algebraically when the first and second piezoelectric disks 21 and 22 are electrically connected as in FIG. 1. The voltages are added algebraically which result in an electrical output signal which is representative of the acoustic energy impinging upon the transducer 10. In accordance with the invention, the first and second rings of the monolithic rim contribute to the radial strain produced within the first and second piezoelectric disks to increase the voltage produced by the first and second piezoelectric disks 21 and 22. Thus the sensitivity and coupling coefficient of the transducer 10 are increased.

When the transducer 10 is used as a sound projector, an electrical input signal voltage from the electrical circuit 11 is applied to terminals 12 and 13. In response to this electrical signal, strains are developed within the first and second piezoelectric ceramic disks 22 and 21, which strains cause the radial dimensions of the first and second piezoelectric disks 21, 22 to change in proportion to the applied input signal voltage. These radial changes are manifested in expansion and contraction along the periphery and principal faces of the first and second piezoelectric ceramic disk respectively. The first and second piezoelectric ceramic disks 21 and 22 are electrically connected so that the electrical input signals to the electrodes 26, 27 of first piezoelectric disk 21 and the electrodes 31, 32 of the second piezoelectric disk 22 are opposite in phase. One of the piezoelectric disks 21, for example piezoelectric ceramic disk 21, will expand while the other one of the first and second piezoelectric ceramic disks 21 and 22 will contract. The first piezoelectric ceramic disk 21 when expanded radially applies a uniform load on the first ring portion of the monolithic rim 6 to derive a first resultant force $R_1$, acting in an outward direction towards the stationary rim portion 36, which direction may be considered as being counterclockwise about the hinge portion 37. The first resultant force $R_1$ acts at a distance $Y_1$ as measured from the neutral plane to the first resultant force $R_1$. The first resultant force $R_1$ acts through a point somewhere midway along the thickness of the first piezoelectric disk 21. Thus the first resultant force applies a torque as defined by the equation:

$$T_1=Y_1R_1 \tag{2}$$

where $T_1$ is the torque acting on the first ring portion 7 of the monolithic rim; $Y_1$ is the distance from the neutral plane to the resultant force; and $R_1$ is the resultant force acting on the ring portion 7 generated by the first piezoelectric ceramic disk 21.

At the same time the seond piezoelectric ceramic disk 22 contracts and urges the second ring portion 8 of the monolithic rim 6 to also pivot in a counterclockwise direction about the neutral plane at the hinge portion 37. The second piezoelectric ceramic disk 21 causes the ring portion 8 of the monolithic beam to pivot because it is bonded radially and tangentially to the ring portion 8 and the center disk portion 9. The second piezoelectric ceramic disk also produces a torque $T_2$ on the monolithic rim 6 in a counterclockwise direction, when contracted, the torque $T_2$ may be shown by an equation similar to Equation 2 as follows:

$$T_2=Y_2R_2 \tag{3}$$

Where $T_2$ is the torque produced by the second piezoelectric ceramic disk 22; $Y_2$ is the distance the resultant force acts on the ring portion 8 of the monolithic rim 6 from the neutral plane at the hinge portion 37 and $R_2$ is the resultant force produced by the radial contraction of the second piezoelectric ceramic disk 22.

The torques $T_1$ and $T_2$ are additive and are similar to a force couple $R_1$ and $R_2$ acting through the neutral plane at hinge portion 37. The resultant forces $R_1$ and $R_2$ along with the tangential forces produced along the principal surfaces 25 and 29 of the first and second piezoelectric disks 21 and 22 contiguous to the center disk portion 9 of the driven radiation portion 35 cause the first and second piezoelectric ceramic disks 21 and 22 along with the center disk portion 9 to dish in a convex manner as shown in FIG. 3.

The first and second piezoelectric ceramic disks 21 and 22 and center disk portion 9 of the driven radiating portion 35 may be made to dish in the opposite direction, that is in a concave manner, by applying an electrical signal of reverse polarity to the first and second piezoelectric ceramic disks to cause the first piezoelectric ceramic disk 21 to contract and the second piezoceramic disk 22 to expand. The process described above is repeatable and may be operated at various frequencies so that the laminar transducing unit may convert electrical signals into mechanical output signals so that the transducer 10 may act as a sound projector.

As was mentioned previously, the criteria for efficient electromechanical transducer is the band width capability and resonance. The band width capability of a transducer is dependent upon several characteristics, and an important one is the coupling coefficient that is the ratio of the electrical energy to the mechanical energy transduced into one another by the electromechanical transducer. The coupling coefficient of an electromechanical transducer was shown herein by Equation 1.

In the present invention the coupling coefficient of the electromechanical transducer 10 is improved by the monolithic rim 6 of the driven radiating portion 35. The improvement lies in the fact that radial expansion or contraction of the first and second piezoelectric disks 21 and 22 is not only transmitted along the bond plane between the principal surfaces 25, 29 of the piezoelectric ceramic disks 21 and 22, but also by the peripheries 2 and 3 of the first and second piezoelectric ceramic disks 21 and 22 to the monolithic rim 6.

Referring now to FIG. 4, another laminar transducing unit 60 is shown. The laminar transducing unit 60 differs from the laminar transducing unit 20 of FIGS. 1–3 in that a single cylindrical cavity 61 and only one piezoelectric ceramic disk 62 is employed to convert an electrical input signal to mechanical motion or to convert mechanical motion to an electrical output signal. The laminar transducing unit 60 acts as a bimorph in that a driven radiating portion 63 of the laminar transducing unit 60 has a different rate of expansion or contraction than the piezoelectric ceramic disk 62. The laminar transducing unit 60 includes a flexural vibrating element 64, including the driven radiating portion 63 having a coaxial cylindrical cavity 61 adapted to receive the piezoelectric ceramic disk 62 in a manner similar to the laminar transducing unit 20. The coaxial cylindrical cavity 61 and the piezoelectric ceramic disk 62 are disposed on one side of the neutral plane which extends through the driven radiating portion 63 and a hinge portion 67 of the flexural vibrating element. The driven radiating portion includes a monolithic rim 68 which encompasses the piezoelectric ceramic disk 62 and restricts the expansion or contraction of the piezoelectric ceramic disk over the entire thickness of the piezoelectric ceramic disk so that a greater differential in axial displacement of the piezoelectric ceramic disk will be derived than if the ceramic disk were cemented on top of another piezoelectric disk in an unrestricted manner as in the prior art. The piezoelectric ceramic disk 62 is cemented within the cavity 61 along its periphery and upon one principal surface thereon. The driven radiating portion 63 may serve as an electrical contact on the one principal surface of the piezoelectric ceramic disk and another lead wire not shown may be soldered to an electrode not shown along the other principal surface 70 of the piezoelectric ceramic disk 62.

In the operation of the laminar transducing unit, an electrical potential applied across surfaces 69 and 70 of the piezoelectric ceramic disk 62 expands or contracts depending upon its polarization and the polarity of the electrical signal applied thereto. For example, when the piezoelectric ceramic disk 62 expands in response to an electrical input signal, the monolithic rim 68 in response to the radial expansion of the piezoelectric ceramic disk 62 pivots about the neutral plane at the hinge portion 67 and causes the driven radiating portion 63 and the piezoelectric ceramic disk 62 to dish or flex to the right. For varying AC signals applied to the piezoelectric disk 62 the driven radiating portion 63 and the piezoelectric disk 62 may be excited into vibration at a frequency corresponding to the frequency of the varying AC signal.

FIG. 5 shows another embodiment of the invention incorporated in a rectangular laminar transducing unit 80 comprising a rectangular flexural vibrating element having a channel 81 adapted to receive a plurality of piezoelectric elements 82 therein and insulated at each end by insulators 84, 84*a*. Alternately interposed between the piezoelectric ceramic elements are electrodes of copper foil or copper mesh 85 and 86 terminating in terminals 87 and 88. The terminals 87 and 88 of the piezoelectric elements 82 are alternately connected to a signal source 89 by wires 91 and 92 respectively. The signal source 89 applies a signal potential of opposite polarity across the piezoelectric elements 82 so that the piezoelectric elements 82 will all expand or contract in unison in response to an electrical input signal. Although only one channel 81 in the flexural vibrating element is shown on one side of a neutral plane, it should be understood that a similar channel not shown may be included in the other side of the neutral plane of the flexural vibrating element 83. The flexural vibrating element 83 may be a rectangular member of resilient material such as Phosphor bronze, aluminum, steel or the like, having stationary rim portions 96 and 96a and a driven radiating portion 95 interconnected to the stationary rim portions 96 and 96a by hinge portions 97 and 97a defined by two sets of grooves 98, 98a and 99, 99a, in a back-to-back relationship. The driven radiating portion 95 is similar to the driven radiating portion 35 of FIG. 1 except that it is rectangular in shape rather than a discoid shape. The driven radiating portion 95 includes monolithic rims 106 and 106a adjacent to the hinge portions 97 and 97a disposed on each end of the driven radiating portion 95. The monolithic rims 106 and 106a may be pivoted about the hinge portion 97 and 97a respectively in response to the expansion or contraction of the plurality of the piezoelectric elements 82. The monolithic rims 106 and 106a respond in a manner similar to the monolithic rim 6 of the driven radiating portion 35 shown in FIGS. 1–3. For example, the plurality of piezoelectric elements 82 may be made to expand in response to an electrical input signal applied to the terminals 87 and 88 whereby the plurality of piezoelectric elements 82 apply a resultant force which acts upon the monolithic rims 106 and 106a at a point distal to the neutral plane through the driven radiating portion 95. Thus a torque is derived which causes the monolithic rims 106 and 106a to pivot about the hinge portions 97 and 97a at the neutral plane and cause the driven radiating portion 95 to flex in a concave-convex manner similar to the radiating portion 35 of the laminar transducing unit 20. The laminar transducing unit 80 shown in FIG. 6 is particularly advantageous because it is capable of supporting high hydrostatic pressure which may in the first instant prestress the piezoelectric elements 82 which prestress may be desirable for high power applications.

While specific embodiments of the invention have been described and shown, these may be considered illustrative. Still further modifications will undoubtedly occur to those skilled in the art. Therefore, the foregoing description is to be considered as illustrative and not in anv limitinz sense.

What is claimed is:

1. An electromechanical transducer of the bender type, comprising:

(a) a frame,
(b) a flexural vibratile member of elastic material including a stationary rim portion fixed to said frame and a driven radiating portion interconnected with said rim portion by a hinge portion disposed along a neutral plane through said driven radiating portion,
(c) a piezoelectric element of a given thickness and polarized for expansion in response to an electrical signal applied on opposite faces thereof,
(d) said vibratile member having a cavity for receiving said piezoelectric element, said cavity being disposed on one side of said neutral plane in said driven radiating portion, and
(e) electrical means for exciting said piezoelectric element into vibrations whereby said driven radiating portion flexes in response to said vibrations.

2. The invention defined in claim 1 further includes means for cementing said piezoelectric element within said cavity.

3. An electromechanical transducer of the bender type, comprising:

(a) a frame,
(b) a flexural vibratile member of elastic material including a stationaiy rim portion fixed to said frame and a driven radiating portion interconnected with said rim portion by a hinge portion disposed along a neutral plane through said driven radiating portion,
(c) a pair of piezoelectric elements of finite thickness and polarized for radial expansion in response to an electrical signal applied on opposite faces thereof,
(d) said driven radiating portion including a pair of cavities disposed in a back-to-back relationship about said neutral plane adapted to receive said pair of piezoelectric elements radially in constraining relationship, and
(e) means for exciting said pair of piezoelectric elements into vibrations.

4. An electromechanical transducer of the bender type, comprising:

(a) a frame,
(b) a rectangular flexural vibratile member of elastic material, including a driven radiating portion, a stationary rim portion disposed at opposite ends of said driven radiating portion and a hinge portion connected to said rim portions and said driven radiating portion,
(c) said hinge portion being disposed along a neutral axial through said driven radiating portion and being substantially thinner than said driven radiating portion,
(d) a rectangular piezoelectric element of a given thickness and polarized for longitudinal expansion in response to an electrical potential applied on opposite faces thereof,
(e) said radiating portion including a channel adapted to receive said rectangular piezoelectric element along the longitudinal axis thereof,
(f) said piezoelectric element being constrained within said channel, and
(g) electrical means for exciting said piezoelectric element into vibration.

5. An electromechanical transducer comprising:

(a) a frame,
(b) a flexural vibratile member including a stationary rim portion fixed to said frame,
(c) said flexural vibratile member having a driven radiating portion interconnected to said stationary rim portion by hinge portion,
(d) an electrically responsive device of a given thickness whose physical dimensions vary directly to an applied electrical input signal thereto,
(e) said driven radiating portion including a monolithic collar on one side thereof constraining said device radially so that said driven radiating portion flexes about said hinge in a flexural mode when said device is excited by said electrical input signal, and
(f) means for applying electrical input signals to said device.

6. The invention defined in claim 5 wherein said collar has a height substantially equal to said thickness of said device.

7. The invention defined in claim 5 wherein said device is piezoelectric.

8. The invention defined in claim 5 wherein said collar prestresses said device.

9. An electromechanical transducer of the bender type, comprising:

(a) a frame,
(b) a flexural vibratile member of elastic material including a stationary rim portion fixed to said frame and a circular driven radiating portion interconnected with said rim portion by a hinge portion disposed along a neutral plane through said driven radiating portion,
(c) a piezolectric disk of a given thickness and polarized for radial expansion response to an electrical signal applied on opposite faces thereof,
(d) said driven radiating portion having a coaxial cavity for receiving said piezoelectric disk, said coaxial cavity being disposed on one side of said neutral plane to define a monolithic rim encircling said disk,
(e) said piezoelectric disk being prestressed by said monolithic rim, and
(f) electrical means for exciting said piezelectric element into vibrations whereby said driven radiating portion flexes in response to said vibrations.

10. An electromechanical transducer of the bender type, comprising:

(a) a frame, (b) a flexural vibratile member of elastic material including a stationary rim portion fixed to said frame and a driven radiating portion interconnected with said rim portion by a hinge portion disposed along a neutral plane through said driven radiating portion, (c) a pair of piezoelectric elements of finite thickness and polarized for radial expansion in response to an electrical signal applied on opposite faces thereof, (d) said driven radiating portion including a pair of cavities disposed in a back-to-back relationship about said neutral plane adapted to receive said pair of piezoelectric elements radially in constraining relationship, (e) said pair of elements being prestressed by said pair of cavities, and (f) means for exciting said pair of piezoelectric elements into vibrations.

References Cited

UNITED STATES PATENTS

| | | | |
|---|---|---|---|
| 3,093,760 | 6/1963 | Tarasevich | 310—9.1 |
| 3,278,771 | 10/1966 | Fry | 310—8.3 |
| 3,275,096 | 9/1966 | Lord | 310—9.1 |
| 3,209,176 | 9/1965 | Paley | 310—8.2 |
| 3,202,962 | 8/1965 | Elston | 340—10 |
| 3,127,527 | 3/1964 | Elston | 310—8.6 |

MILTON O. HIRSHFIELD, *Primary Examiner.*

J. D. MILLER, *Assistant Examiner.*